UNITED STATES PATENT OFFICE.

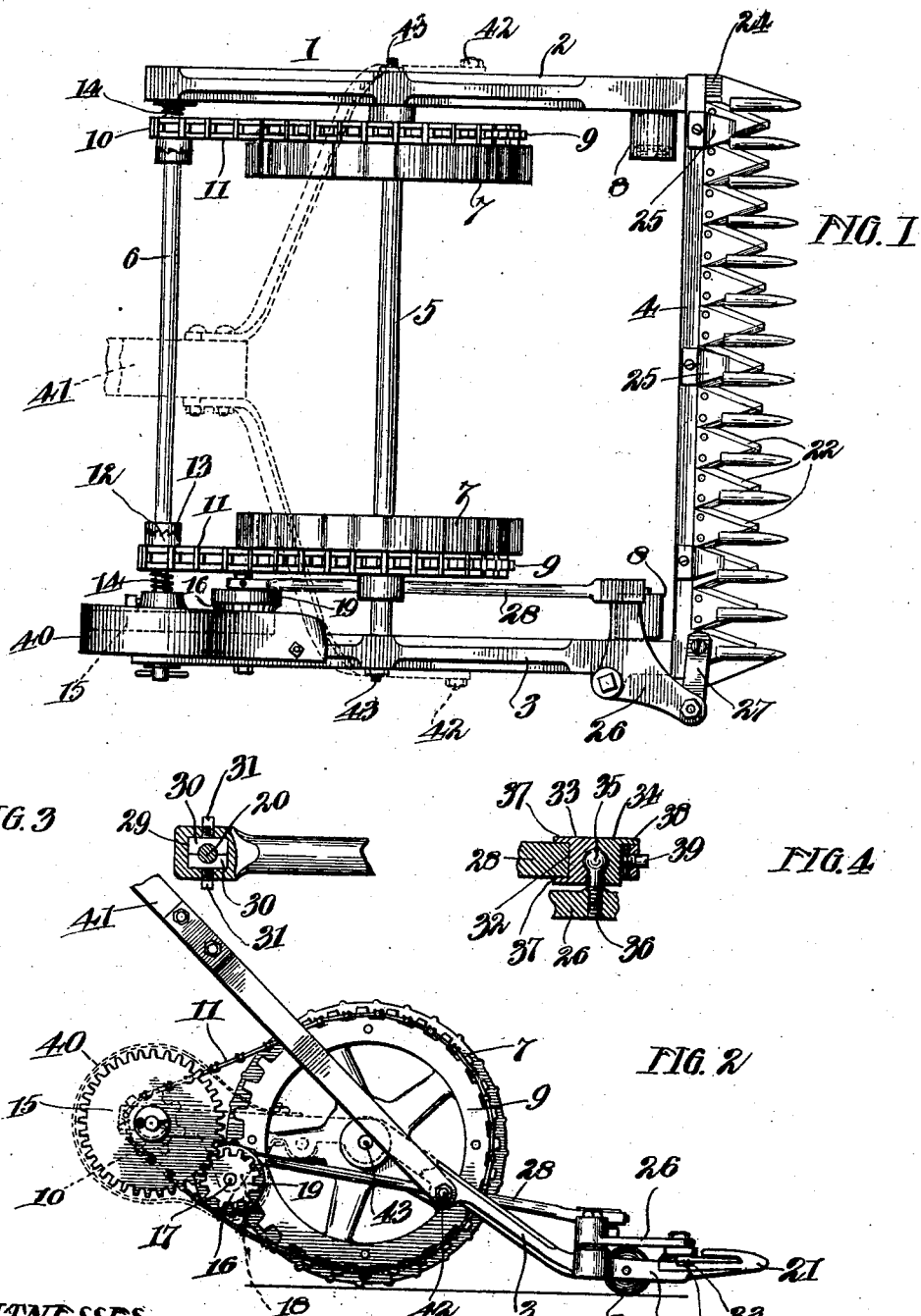

CHARLES E. JACKSON, OF ROCKFORD, ILLINOIS.

LAWN-MOWER.

No. 861,287.　　　Specification of Letters Patent.　　　Patented July 30, 1907.

Application filed June 29, 1906. Serial No. 323,985.

*To all whom it may concern:*

Be it known that I, CHARLES E. JACKSON, a citizen of the United States, residing at Rockford, in the county of Winnebago and State of Illinois, have invented certain new and useful Improvements in Lawn-Mowers, of which the following is a specification.

This invention relates to lawn mowers comprising a reciprocatory sickle bar, and one of its objects is to provide improved means for actuating said bar.

The invention also relates to the improvements in details of construction of lawn mowers hereinafter set forth.

In the accompanying drawings, Figure 1 is a top plan view of a lawn mower embodying the features of my invention, the propelling handle being represented as broken away. Fig. 2 is a side elevation of the lawn mower, a part of the framework being broken away to disclose some of the mechanism. Fig. 3 is a detail view of one end of the pitman, and Fig. 4 is a detail view of the opposite end of said pitman.

The embodiment herein shown of this invention comprises a rigid framework 1 consisting of the side members 2 and 3, the finger bar 4 connecting the forward ends of said side members, and the shaft 5 extending between the middle portions of said members. A shaft 6 is rotatably mounted in bearing openings formed in the rear ends of the side members 2 and 3. The frame 1 is supported upon and the mechanism is driven by means of two ground wheels 7 rotatably mounted upon the shaft 5 within the frame 1. The forward end of the frame 1 is held at a suitable distance from the ground by means of two rollers 8 rotatably mounted upon the side members 2 and 3. A sprocket wheel 9 is formed upon the outer side of each of the ground wheels 7, and over said sprocket wheels and two sprocket wheels 10 loosely mounted upon the shaft 6 extend two chains 11. The sprocket wheels 10 are arranged to have a clutch connection with the shaft 6, the hubs of said wheels having teeth 12 formed thereon adapted to engage similar teeth formed upon collars 13 fixed upon said shaft. The sprocket wheels 10 are normally held in clutch with the shaft 6 by means of coiled springs 14 surrounding said shaft and bearing against said wheels. A gear wheel 15 fixed upon the shaft 6 meshes with a pinion 16 rotatably mounted upon a stud 17 projecting inwardly from a depending lug 18 formed upon the side member 3. Said pinion 16 is formed integral with a crank disk 19 provided with a wrist-pin 20.

The finger bar 4 is provided with the guard fingers 21 having shear edges (not shown) adapted to coact with sickle-sections 22 secured to a sickle-bar 23. Said sickle-bar is slidably mounted in a groove 24 formed in the upper side of the finger bar 4, and is held from upward displacement by means of a plurality of spring clips 25. The sickle-bar 23 is reciprocated by means of a bell-crank lever 26, one arm of which lever is connected with one end of said sickle-bar by the connecting rod 27. The other arm of said lever is connected with the crank disk 19 by means of the pitman 28. One end of the pitman 28 has an opening 29 therein adapted to receive two bearing-brasses 30 forming the bearing for the wrist-pin 20. Said brasses are held in place by means of two set screws 31. The opposite end of the pitman 28 has an opening 32 therein adapted to receive two brasses 33 and 34 forming between them a socket for the reception of the rounded head 35 of a stud 36 fixed to the bell-crank lever 26. The brass 33 is held from vertical displacement by means of flanges 37 lying at opposite sides of the pitman 28. The brass 34 has a flange 38 at its upper side only, and said brasses are held in place by means of a set-screw 39.

The distance between centers of the guard fingers 21 is slightly less than the distance between centers of the sickle-sections 22. It will thus be seen that the sickle-sections are at different positions with relation to the sections are at different positions with relation to the shear edges of their respective guard fingers, and therefore that said sickle-sections will finish their cuts at different times, thereby lessening the amount of power required to operate the lawn-mower.

A shield or cover 40 extends about the peripheries of the gears 15 and 16.

The propelling handle 41 is of the usual bail form at its lower end, the arms of the bail being pivoted to the frame 1 at 42. Downward movement of the handle 41 is limited by the projecting ends 43 of the fixed shaft 5, said ends 43 extending into position to support the bail arms of said handle.

In operation, power to reciprocate the sickle-bar 23 is transmitted from the ground wheels 7 to the bell-crank lever 26 through the sprocket chain 11, the sprocket wheels 10, the gear wheel 15, the pinion 16, the crank disk 19 and the pitman 28. When the mower is drawn rearwardly by the operator, the springs 14 yield to allow the sprocket wheels 10 to rotate in the reverse direction without turning the shaft 6.

It will be observed that I provide a simple, light, strong and compact apparatus by the construction described and shown. By utilizing the main shaft 5 as a connecting rod at the middle of the frame and by employing an intermediate shaft extending from one side member to the other at a point back of the ground wheels, it will be observed that I avoid the necessity of bracing or connecting the side members by transverse bars or braces. This arrangement of the intermediate shaft also enables me to employ sprocket wheels and chains instead of the usual internally geared wheels and pinions, which latter are more liable to get out of order and rattle than a sprocket and chain arrangement. By employing two sets of sprocket wheels and chains an even power is applied to the intermediate shaft. This arrangement of the intermediate shaft also enables me to employ a simple arrangement of clutches, one of the clutches being held normally in engagement by a spring bearing against the adjacent side members and the other being held in engagement by a spring bearing against the driving spur gear on the shaft. It will be observed further that the gears 15 and 16 are arranged back of the main shaft where they can be easily guarded or protected and where they will tend to balance the machine on the main axle.

Another feature lies in the fact that by the arrangement shown the driving pinion 16 may be located on a stub shaft carried by one of the side members in front of the spur gear 15 and sufficiently low down to bring the pitman rod 28 nearly to a horizontal position, so that the bell-crank which operates the sickle-bar will be actuated without strain on its vertical pivot.

I claim as my invention:

1. In a lawn mower, in combination, a supporting frame comprising a pair of side members and a finger bar in front, a main axle connecting the side members about midway their length, an intermediate shaft connecting the side members at the rear ends thereof, ground wheels loosely journaled on the main shaft and each carrying a sprocket wheel, a pair of sprocket wheels on the intermediate shaft and chains connecting them to the aforesaid sprocket wheels, spring-actuated clutches on the intermediate shaft, a spur gear on one end of the intermediate shaft, a smaller gear journaled on a stub shaft supported in front of and below the center of said spur gear, a pitman connected to this smaller gear and extending forwardly below the main shaft, and a cutting apparatus connected to and operated by said pitman.

2. In a lawn mower, in combination, a supporting frame, a main axle thereon carrying ground wheels, an intermediate shaft supported in the frame behind said ground wheels, means for driving this intermediate shaft from the ground wheels, an automatic clutch on the intermediate shaft, a spur gear at one end of the intermediate shaft inside the side member of the frame, a smaller gear journaled on a stub shaft carried by the said side member of the frame, this stub shaft being supported in front of the aforesaid spur gear and below its center, a pitman connected to a wrist-pin carried by this smaller gear, said pitman extending forwardly underneath the axle, a bell-crank connected to the forward end of the pitman, and cutting means connected to said bell-crank.

CHARLES E. JACKSON.

Witnesses:
MARGARET C. RYAN,
R. R. SHIRLEY.